United States Patent [19]

Lepp et al.

[11] Patent Number: 4,655,001

[45] Date of Patent: Apr. 7, 1987

[54] TREATMENT OF TREES AND BUSHES

[75] Inventors: Nicholas W. Lepp, Liverpool; David A. Phipps, Southport, both of England

[73] Assignee: Pilkington Brothers P.L.C., St. Helens, England

[21] Appl. No.: 786,687

[22] Filed: Oct. 11, 1985

[30] Foreign Application Priority Data

Oct. 19, 1984 [GB] United Kingdom ............ 8426553
Jun. 12, 1985 [GB] United Kingdom ............ 8514885

[51] Int. Cl.$^4$ .................. A01G 7/06; C05G 3/00
[52] U.S. Cl. .................. 47/57.5; 71/64.11; 71/64.13
[58] Field of Search ............ 47/57.5, 77, 74, 9, 47/48.5; 71/64.11, 64.13

[56] References Cited

U.S. PATENT DOCUMENTS

| | | | |
|---|---|---|---|
| 2,192,939 | 3/1940 | Slayter et al. | 47/9 X |
| 3,280,504 | 10/1966 | Laing | 47/57.5 |
| 3,691,683 | 9/1972 | Sterzik | 47/57.5 |
| 3,930,833 | 1/1976 | Roberts | 71/64.13 X |
| 4,308,689 | 1/1982 | Jenson et al. | 47/57.5 |

*Primary Examiner*—Robert E. Bagwill
*Attorney, Agent, or Firm*—Burns, Doane, Swecker & Mathis

[57] ABSTRACT

A process for treating trees and bushes having a xylem structure through which sap passes so as to provide trace elements or micro-nutrients selected from calcium, zinc, magnesium, iron, manganese, copper, molybdenum, nickel and boron to the tree or bush, comprising inserting into the xylem structure a solid glass article comprising a phosphate base glass containing the trace elements or micro-nutrients in oxide form, the formulation of the phosphate base glass being selected so that the solubility of the phosphate glass in the sap of the tree or shrub being treated is sufficient to provide a transfer of the said trace elements or micro-nutrients from the glass into the sap by dissolution of the glass.

10 Claims, No Drawings

TREATMENT OF TREES AND BUSHES

FIELD OF THE INVENTION

This invention relates to the treatment of trees and bushes to remedy or prevent micro-nutrient deficiencies; more particularly this invention ensures that a sufficiency of desired plant nutrients is available to participate in the metabolic processes of the trees or bushes.

Such deficiencies are well known, and fall into two classes:

Absolute—a true deficiency of the essential element in the growth medium.

Induced—sufficient quantities of the essential element are present in the growth medium, but the element cannot be taken up by plant.

Absolute deficiencies are geographically dispersed since they will depend on the soil type, and in many cases, the previous cultivation treatment of the now deficient area. Induced deficiencies can occur for several reasons, but the best known is that which occurs on calcareous soils or in cultivation where liming has taken place. In both cases, the mineral nutrients are rendered unavailable by various processes including precipitation.

DESCRIPTION OF THE PRIOR ART

Various remedies have been proposed, and in the case of absolute deficiencies, simple application of the appropriate element to the soil as an inorganic salt may be effective. However, where the soil type is one which will interfere with uptake by the plant, i.e. in the case of induced deficiencies, such treatments tend to require high dose rates to be effective, and these are both expensive and difficult to achieve in the case of most of the needed elements. More recently, complexes have been used which are not precipitated, and maintain the element free for up-take.

As an alternative to soil application the plant can be treated by spraying the foliage itself with a solution or dispersion of the desired element or elements either as a single salt or a complex. This type of treatment is more effective than any soil applied treatment but is far from perfect in that much of the applied material can be lost by run-off (and, if rain occurs shortly after application, may be washed off) and only a small proportion of the applied dose is absorbed. Also the absorption occurs over a limited period of time, so that an unwanted peak occurs in the micro-nutrient level without giving a long lasting increase in level. Several of the elements commonly applied in this way such as zinc and copper are poorly mobile from sprayed leaves, and new leaves have to be sprayed to maintain control over the deficiency. This means that several applications may be needed during a growing season.

In the case of trees and bushes, an alternative route is available, namely the direct introduction of the required element, in a suitable chemical form, into the limbs or trunk. These treatments have included pressure injection, implantation of capsules of salts of the elements, and the use of a cylindrical clay tablet with a concentrate of the element absorbed on the clay.

The first two of these methods still have the disadvantage of a rapid rise in the concentration of the injected element which may cause tissue damage due to either osmotic effects or specific metabolic interactions or both. The use of a zinc-Bentonite paste introduced into holes in the tree being treated which are then plugged with a plastic stopper is described in Hort. Science, Vol 15(2), April 1980, pages 182 and 183. A further paper in Plant and Soil, 69, 85-95, (1982) describes the use of zinc containing clay tablets implanted in holes drilled in the trunk of the tree being treated. This work showed that a more than adequate supply of zinc could be given, in the case of the tablets implanted in apple trees, and the paste applied to pear trees. The method of application is simple in that all that is needed is to bore one or more holes in the tree trunk to receive the paste or tablet. However, in the case of the clay paste treatment, definite indications were found that most of the zinc was released from the clay during a period of up to 6 weeks after application. This shows that there can be problems in ensuring adequate release over a lengthy growing season. Such problems may also occur with the clay tablet and if it is other than air dried, the rate of release can be decreased. The release is by a leaching mechanism which makes it difficult to produce a uniform product with a consistent performance.

SUMMARY OF THE INVENTION

We have found that it is possible by use of a soluble glass article, e.g. in the form of a rod, cone, or beads, to achieve the release of trace elements in a uniform and consistent manner within the trunks or limbs of a tree or bush so that the elements can participate in the metabolic processes which are taking place within the tree. It is not possible to use glasses which are high in boron content due to the phyto-toxicity of boron, likewise glasses should be low in alumina ($Al_2O_3$) and it has therefore been found necessary to use a phosphate glass as the base glass. As a glass is formed from a selected group of components, it is possible to formulate a glass with an appropriate release rate of the elements provided as micro-nutrients. Also, because of the uniformity of the finished glass, it is possible to achieve a predictable overall release rate over the life of the glass article within the tree or bush.

We have found that the major controlling factor governing the release rate of the trace elements from the glass is the amount of $R_2O$ (where R is K, Na, or Li) and the quantity and nature of the trace element constituents in the glass. It is necessary to use a glass composition in which the total of $P_2O_5$ and $R_2O$ is at least 56 mol % and $R_2O$ is preferably in the range 25 to 55 mol %. A high level of $R_2O$ is needed, e.g. to achieve an adequate release rate in an article which has Fe and/or Zn present as these materials are particularly effective in increasing the durability of the phosphate glass in the presence of a sap which is slightly acid due to the presence of organic acids. The effects of the other potential trace element constituents on the solubility of phosphate glasses within the specified ranges of major components are illustrated below. $C_aO$ and $M_gO$ increase durability to a more limited extent.

According to the invention there is provided a process for treating trees and bushes having a xylem structure through which sap passes to provide trace elements or micro-nutrients thereto, which process comprises inserting into the xylem structure a solid glass article comprising a phosphate base glass containing in oxide form a trace element or micro-nutrient selected from calcium, zinc, magnesium, iron, manganese, copper, molybdenum, nickel, boron, and mixtures thereof, the phosphate base glass being a phosphate glass in which the major components, which comprise at least 56 mol % of the glass composition, are $P_2O_5$ and $R_2O$ (wherein R is one or more of Na, K, and Li), the maximum content of $P_2O_5$ being 55 mol %, and the minimum content of $R_2O$ being 17 mol %, the phosphate glass optionally comprising one or more glass-modifying or glass-forming materials (other than the trace elements present) in non phytotoxic amounts, the formulation of the phosphate base glass being selected so that the solubility of the phosphate glass in the sap of the tree or shrub being treated is sufficient to provide a transfer of the said trace elements or micro-nutrients from the glass into the sap by dissolution of the glass.

DESCRIPTION OF THE PREFERRED EMBODIMENTS

In one embodiment of the present invention, the total amount of $P_2O_5$ and $R_2O$ in the phosphate base glass is at least 60 mol %.

We have established as illustrated in the experiments below that glass articles placed in xylem of trees and bushes release trace elements in a form that is assimilated. These experiments have demonstrated the effectiveness of the method of the invention in supplying trace elements to the foliage of trees and bushes.

In order to monitor the living system into which the articles or implants were introduced, and to enable positive identification of the assimilation into the system of trace elements from the dissolving glass, an experiment was carried out using artificial "trees", namely woody branches of Willow (Salix sp).

(a) Plant material-collection and preparation

The Willow (Salix sp) used consisted of 0.75–1.0 m lengths with a diameter of 8–10 cm and were all collected from the same tree.

Following collection in early November 1983, the branches were plunged into 15 cm pots containing acid-washed sand and plunged into a soil bed in the open. Any small or damaged branches were discarded.

(b) Experimental procedure

Two types of implant were made. These were implanting before bud-burst (early December 1983) and implanting at the time of bud-burst (late February 1984), after a period of winter chilling.

Pellets (10 mm diameter, 5 mm long) were applied at the rate of one per 4 cm of circumference. Mixed Fe/Zn pellets were applied, having the compositions set out in Table III below. Composition 72 was used for the December implants and composition 73 for the February implants and some branches were left as untreated controls. The glass pellet is attacked at a reduced rate at a time of reduced sap flow i.e. over winter. All implants were made in a spiral manner around the branches. After implanting, the December branches were replaced in the open, and the February branches were maintained in the open until treated. Buds were evident in late February, and at this time, both groups of branches were placed in an unheated glasshouse to hasten shoot development. Eventually, when ambient temperatures had risen, all branches were returned to the open and plunged into shady, moist conditions until the shoots were harvested. This was carried out in late May 1984. The majority of the shoots were 2–3 months old at the time of harvest.

(c) Preparation of samples and elemental analysis

The shoots were oven-dried to constant weight in a fan assisted oven at 70° C. The dried tissue was ground in a Wiley mill, and weighed portions were digested under pressure using 71% $HNO_3$. Each experimental branch produced 3 replicate digests. After digestion, samples were filtered and made up to 25 ml with deionised water prior to analysis for Fe and Zn by flame atomic absorption spectroscopy (AAS).

Results

The overall results from the individual measurements on samples of the December and February implants are summarised in Table I.

TABLE I

| Fe and Zn content of Salix shoots in relation to timing and type of implanting (μg per g dry weight) | | |
|---|---|---|
| Implant | Fe | Zn |
| 1983 | | |
| Fe/Zn | 200.05 ± 29.5 | 285.5 ± 40.7 |
| Control | 172.05 ± 23.1 | 264.7 ± 40.0 |
| 1984 | | |
| Fe/Zn | 168.6 ± 8.13 | 279.18 ± 44.1 |
| Control | 144.5 ± 7.8 | 214.3 ± 14.9 |

Values are ± SD.

It can be seen that in both cases, the Fe/Zn implant treatments result in increases in shoot Fe and Zn content. These increases are more or less independent of time of implantation for Fe, but significantly more Zn can be found in the shoots of the February implants. It is evident that the supply of Fe and Zn from the implants takes place as a gradual process and thus benefits from a controlled release. This may be related to the incorporation of the elements into the biologically active compounds in the tissues of the shoot. Glasses 72 and 73 were selected to see if in addition there was any difference and benefit arising from the use of sodium phosphate glass containing zinc and iron compared with a potassium phosphate glass containing zinc and iron. No difference was detected.

A larger full scale trial was also undertaken using trees in a shelter belt surrounding the main laboratory site of Pilkington Research Laboratories at Lathom.

This trial utilised Sycamore (*Acer pseudoplatanus*) as the experimental tree. 40 trees were selected and treated with a range of implants, whose composition and release characteristics in distilled water are set out below in Table III as Examples 7, 11, 13, 21, 27 and 54. In Table III the release rates (i.e. rates of dissolution) quoted are obtained by measuring the weight of glass lost from the glass implant over a period of time; values are given in $mg/cm^2/day$.

The experiments were based on the use of a series of glasses containing either zinc or iron which were of a composition chosen to dissolve rapidly (Code F), at a medium rate (Code M) and a slow rate (Code S). In addition to differences in rate of dissolution, each application was made at a normal rate and a twice normal rate (Code X2). At the normal rate trees were implanted according to girth, one pellet per 8 cm circumference. At twice normal rate, 2 pellets per 8 cm circumference were implanted. Holes were made using an electric drill, pellets inserted, and the holes were then sealed with a flexible sealant such as the material sold under the trade name "Blu-Tack". Trees were marked and tagged for ease of subsequent identification.

Foliar collection and analysis

Foliage was collected from all the trials on four occasions; June 1983, July 1983, September 1983 and May 1984. Leaf samples were collected from the ends of branches in the lower crown of each tree, using high pruners.

Several samples were combined to make a composite sample for each tree. On return to the laboratory, the leaf blades were separated, cleaned of any extraneous debris, then oven-dried to constant weight (70° C.). Dried samples were ground, using a Tecator mill and triplicate weighed sub-samples from each sample were digested with 71% $HNO_3$, under pressure. Digests were filtered, made up to constant volume with deionised water and analysed for Fe and Zn content by flame AAS.

The results obtained from these samplings are given in the Table II below.

Values in $\mu g$ element g dry wt. ($\pm SD$).

TABLE II

Mean Fe and Zn levels (+SD) in Acer foliage 11 months after receiving the specified implanting regime

| Treatment | Fe June 1983 | Fe May 1984 |
|---|---|---|
| Control | 80.9 ± 19.4 | 103.8 ± 9.3 |
| Glass 21(S) | 83.7 ± 8.4 | 171.9 ± 56.3 |
| Glass 21(S × 2) | 89.0 ± 16.9 | 193.9 ± 37.1 |
| Glass 13(M) | 85.1 ± 7.4 | 137.9 ± 38.4 |
| Glass 13(M × 2) | 89.4 ± 19.2 | 134.1 ± 18.6 |
| Glass 7(F) | 76.4 ± 14.6 | 153.2 ± 42.9 |
| Glass 7(F × 2) | 86.3 ± 19.5 | 147.7 ± 30.3 |
| Control | 45.1 ± 16.9 | 69.6 ± 12.6 |
| Glass 27(S) | 45.6 ± 4.5 | 72.5 ± 8.5 |
| Glass 27(S × 2) | 48.4 ± 4.5 | 72.6 ± 20.3 |
| Glass 54(M) | 48.4 ± 4.5 | 61.2 ± 9.5 |
| Glass 54(M × 2) | 47.0 ± 5.6 | 70.2 ± 22.4 |
| Glass 11(F) | 45.1 ± 7.8 | 79.8 ± 2.3 |
| Glass 11(F × 2) | 45.4 ± 6.3 | 98.2 ± 17.2 |

In Table II, the values quoted for June 1983 are values measured on samples prior to any treatment in accordance with the invention and give base levels for Fe and Zn content in the samples.

From the data in Table II, it is evident that the Fe implants are effective in raising the leaf Fe status of the treated trees. In the case of Zn, only the Zn(F×2) had a release rate adequate to produce a significant increase in foliar Zn levels. The medium rate Fe glass in fact dissolved very rapidly, which could account for its relative lack of efficiency in increasing the Fe status of foliage. Although control Fe and Zn levels are higher in 1984, this does not appear to be significant; whilst it may make some contribution to a general increase in foliar element levels between the two seasons, this cannot be viewed as a major factor contributing to the observed increase in these levels in response to particular treatments.

The results from the main trial demonstrate that soluble glass implants can supply Fe, and Zn to developing foliage in a mature tree. The results indicate that an increase in Fe in the tree prior to leaf formation has the greatest influence on foliar Fe content; introduction of soluble Fe after the leaves are fully expanded and developed has little influence on the levels of Fe in leaf tissue, in the short term. It is the long term, presumably steady, supply of Fe which subsequently influences foliar Fe levels.

The results as set out in Tables I and II above clearly demonstrate that both Zn and Fe have been assimilated by the various trees sampled. The problem of obtaining a standard set of trees makes it difficult to define exactly the composition to be used but it is clear that glass compositions exemplified with having rates of dissolution (release rates) in the range 0.1 to 20 mg/cm²/day are acceptable. Such release rates are measured as the loss of weight of the glass article per unit area pe day.

An important world wide crop which can suffer from micro-nutrient deficiencies is the grape. Many factors affect the yield and quality of grapes but it is known that micro-nutrient deficiencies can have a considerable impact. Iron in particular makes an important contribution to the healthy growth of vines and since they are grown on calcereous soils iron is often unavailable and a deficiency occurs. Conventional treatment to prevent such a deficiency is by a foliar spray with all the attendant problems indicated above of such a form of treatment. It has been established by a trial as described below that by use of the method of the present invention the iron content of vines can be maintained throughout a growing season and an increased yield of grapes obtained without any adverse affect on acidity and sugar content.

Twenty three vine specimens were treated in two rows in a vineyard in Sussex, England.

The treatment was carried out using rod-like glass pellets (10 mm diameter, 5 mm long) of the composition of Glass 39 in Table III.

Seventeen specimens were implanted just after bud burst and the remainder left as controls. At the end of the season, all grapes were harvested by hand, and the yield for each vine recorded. In addition samples of the foliage were removed. The yield, sugar content and acidity were determined for each vine, and the foliage samples analysed for iron. The results are given below. The yield is the yield of fruit in fresh weight/vine.

| | Treated | Untreated |
|---|---|---|
| Yield (kg/vine) | 3.4 | 2.7 |
| Iron content ($\mu g/g$ wt) | 107.7 | 88.9 |

There was no significant difference in acidity and sugar content indicating that the increased yield was obtained without any adverse affect on the quality of the grapes. The up-take of iron due to the presence of the glass pellet has been clearly shown by this experiment.

We have found distilled or deionised water can be used to provide an indication of the likely release rate within a tree and, in determining the range of effective glasses, this material has been used to screen glasses to ensure that they will have an effective release rate. A selection of typical compositions which can be used to produce different release rates in the presence of one or more trace elements or micro-nutrients is set out in Table III below. In Table III, release rates are quoted in mg/cm²/day and are measured as rates of loss of weight of the glass implant per unit area per day. The quantities of the components of the glasses are given in mol %.

The glass formulations of Glasses Nos. 74 to 95 in Table IV were in the form of beads or ballotini. The release rates given in Table IV for Glasses Nos. 74 to 95 were obtained from measurements of the rate of dissolution of the beads or ballotini and are given in mg/g/day. A preferred range of release rates for glass compositions in the form of beads or ballotini is from 1 to 10 mg/g/day, typically from 5 mg/g/day. In order to measure the release rate of a particular glass, a fraction −2.0 mm+1 mm was separated from ballotini made by flowing molten glass onto a spinning disc. Ballotini provide a convenient form for placing glass articles within a tree or shrub as they can simply be poured from a dispenser into holes in the branches or stems of a plant. This convenient form also means that glasses of different composition and different release rates can be used in the same treatment should this be required for any particular reason.

ing in oxide form a trace element or micro-nutrient selected from calcium, zinc, magnesium, iron, manganese, copper, molybdenum, nickel, boron, and mixtures thereof, the phosphate base glass being a phosphate glass in which the major components, which comprise at least 56 mol % of the glass composition, are $P_2O_5$ and

TABLE III

| GLASS NO. | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| $K_2O$ | 49 | 49 | 48 | 48 | — | 48 | 14.0 | 14.8 | 12.0 | 14.0 | — | — | 10 | 47.0 | 14.0 | 14.0 | 14.0 | 14.0 | 8.0 |
| $P_2O_5$ | 35 | 37 | 36 | 38 | 40.0 | 40 | 40.0 | 37.6 | 41.0 | 40.0 | 39.85 | 39.75 | 42.0 | 41.0 | 39.25 | 39.75 | 40.0 | 38.5 | 43.0 |
| $Fe_2O_3$ | 8.0 | 7.0 | 8.0 | 7.0 | — | 6.0 | 6.0 | 5.0 | 6.0 | 6.0 | — | — | 6.0 | 6.0 | 7.5 | 6.5 | 6.0 | 5.0 | 6.0 |
| ZnO | 8.0 | 7.0 | 8.0 | 7.0 | 20.0 | 6.0 | — | 5.0 | — | — | 20.0 | 20.0 | — | 6.0 | — | — | — | 5.0 | — |
| $Na_2O$ | — | — | — | — | 40.0 | — | 40.0 | 37.6 | 41.0 | 40.0 | 39.85 | 39.75 | 42.0 | — | 39.25 | 39.75 | 40.0 | 38.5 | 43.0 |
| CaO | | | | | | | | | | | | | | | | | | | |
| $Al_2O_3$ | — | — | — | — | — | — | — | — | — | — | 0.3 | 0.5 | — | — | — | — | — | — | — |
| Release Rate | 645 | 593 | 539 | 372 | 337 | 319 | 274 | 170 | 169 | 158 | 157 | 132 | 88 | 65 | 48 | 41 | 40 | 39.7 | 31.0 |

| GLASS NO. | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|
| $K_2O$ | 14.0 | 6.0 | 38.0 | — | 12.0 | 39.0 | 46.0 | — | 14 | 14.0 | — | 12.0 | 6.0 | — | 11.0 | 41.0 | 11.0 | 16.0 | 40.0 |
| $P_2O_5$ | 39.5 | 44.0 | 38.0 | 46.25 | 40.25 | 39.0 | 42.0 | 38.5 | 39.25 | 39.0 | 38.25 | 37.0 | 38.5 | 38.0 | 41.0 | 41.0 | 39.0 | 36.0 | 40.0 |
| $Fe_2O_3$ | 7.0 | 6.0 | 6.0 | 7.5 | 7.5 | 6.0 | 6.0 | — | 7.5 | 8.0 | — | 7.0 | 6.0 | — | 7.0 | 6.0 | 6.0 | 6.0 | 6.0 |
| ZnO | — | — | 6.0 | — | — | 6.0 | 6.0 | 20.0 | — | — | 20.0 | 7.0 | 5.0 | 20.0 | — | 6.0 | 5.0 | 6.0 | 6.0 |
| $Na_2O$ | 37.5 | 44.0 | 12.0 | 46.25 | 40.25 | 10.0 | — | 38.5 | 39.25 | 39.0 | 38.25 | 37.0 | 12.0 | 38.0 | 41.0 | 6.0 | 39.0 | 36.0 | 8.0 |
| CaO | | | | | | | | | | | | | | | | | | | |
| $Al_2O_3$ | — | — | — | — | — | — | — | 3.0 | — | — | 3.5 | — | — | 4.0 | — | — | — | — | — |
| Release Rate | 29.0 | 24.0 | 23.0 | 17.6 | 15.0 | 14.0 | 13.0 | 11.7 | 9.8 | 6.8 | 6.7 | 6.7 | 5.3 | 4.9 | 4.8 | 4.3 | 3.7 | 3.7 | 3.2 |

| GLASS NO. | 39 | 40 | 41 | 42 | 43 | 44 | 45 | 46 | 47 | 48 | 49 | 50 | 51 | 52 | 53 | 54 | 55 | 56 | 57 |
|---|---|---|---|---|---|---|---|---|---|---|---|---|---|---|---|---|---|---|---|
| $K_2O$ | 42.0 | 10.0 | 13.0 | 12.0 | 9.0 | 10.0 | 18.0 | — | 8.0 | 8.0 | — | 4.0 | 12.0 | — | 10.5 | — | 9.0 | — | 10 |
| $P_2O_5$ | 42.0 | 41.25 | 39.5 | 38.0 | 40.0 | 39.0 | 50.0 | 37.5 | 39.0 | 40.0 | 37.25 | 40.0 | 38.0 | 41.0 | 41.0 | 37.0 | 41.5 | 41.0 | 41.0 |
| $Fe_2O_3$ | 6.0 | 7.5 | 8.0 | 6.0 | 6.0 | 6.0 | — | — | 7.0 | 6.0 | — | 6.0 | 6.0 | 8.0 | 7.5 | — | 8.0 | 10.0 | 8.0 |
| ZnO | 6.0 | — | — | 6.0 | 5.0 | 6.0 | — | 20.0 | 7.0 | 6.0 | 20 | 10.0 | 6.0 | — | — | 20.0 | — | — | — |
| $Na_2O$ | 4.0 | 41.25 | 39.5 | 38.0 | 40.0 | 39.0 | — | 37.5 | 39.0 | 40.0 | 37.25 | 40.0 | 38.0 | 51.0 | 41.0 | 37.0 | 41.5 | 49.0 | 41.0 |
| CaO | — | — | — | — | — | — | 32.0 | — | — | — | — | — | — | — | — | — | — | — | — |
| $Al_2O_3$ | — | — | — | — | — | — | — | 5.0 | — | — | 5.5 | — | — | — | — | — | 6.0 | — | — |
| Release Rate | 3.0 | 2.8 | 2.6 | 2.6 | 2.6 | 2.5 | 2.4 | 2.4 | 1.7 | 1.7 | 1.4 | 1.3 | 1.2 | 1.0 | 0.9 | 0.8 | 0.8 | 0.7 | 0.7 |

| GLASS NO. | 58 | 59 | 60 | 61 | 62 | 63 | 64 | 65 | 66 | 67 | 68 | 69 | 70 | 71 | 72 | 73 |
|---|---|---|---|---|---|---|---|---|---|---|---|---|---|---|---|---|
| $K_2O$ | 2.0 | 6.0 | 7.0 | 4.0 | 12.0 | 6.0 | — | 8 | — | — | — | — | — | — | 12 | 42.0 |
| $P_2O_5$ | 39.25 | 40.0 | 42.5 | 44.25 | 39.0 | 43.25 | 46.0 | 41.0 | 48 | 50 | 52 | 51.0 | 39.25 | 40.0 | 38 | 42.0 |
| $Fe_2O_3$ | 7.50 | 7.0 | 8.0 | 7.5 | 10.0 | 7.5 | 8.0 | 10.0 | 9.0 | 8.0 | 8.0 | 8.0 | 7.5 | 6.0 | 6.0 | 6.0 |
| ZnO | 12.0 | 7.0 | — | — | — | — | — | — | 8.0 | — | — | — | 14.0 | 14.0 | 6.0 | 6.0 |
| $Na_2O$ | 39.25 | 40.0 | 42.5 | 44.25 | 39.0 | 43.25 | 46.0 | 41.0 | 44.0 | 42.0 | 40.0 | 41.0 | 39.25 | 40.0 | 38.0 | 4.0 |
| CaO | | | | | | | | | | | | | | | | |
| $Al_2O_3$ | — | — | — | — | — | — | — | | | | | | | | | |
| Release Rate | 0.6 | 0.5 | 0.5 | 0.41 | 0.40 | 0.39 | 0.30 | 0.2 | 0.17 | 0.16 | 0.13 | 0.11 | 0.05 | 0.02 | 2.0 | 3.0 |

TABLE IV

| GLASS NO. | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
|---|---|---|---|---|---|---|---|---|---|---|---|---|---|---|---|---|---|---|---|---|---|---|
| $K_2O$ | 40 | 44 | 42 | 29 | 32 | 34 | 40 | 18.8 | 38.0 | 35 | 34 | 36 | 34 | 22 | 30 | 33 | 31 | 21 | 20.2 | 19.2 | 34 | 36 |
| $P_2O_5$ | 40 | 44 | 42 | 49.5 | 36 | 35 | 36 | 49.4 | 42.0 | 49.5 | 46 | 42 | 40 | 38 | 38 | 35.5 | 37.5 | 39.0 | 39.4 | 40 | 35.5 | 34.5 |
| $Fe_2O_3$ | 16 | 8 | 6 | — | 16 | 16 | — | — | — | — | — | — | — | — | — | 15 | 15 | — | — | — | 14 | 14 |
| ZnO | — | — | 6 | 1.5 | — | — | — | 1.8 | — | 1.5 | — | — | — | — | — | 1.5 | 1.5 | — | — | — | 1.5 | 1.5 |
| $Na_2O$ | 4 | 4 | 4 | — | 16 | 15 | — | — | — | — | — | — | — | — | — | 15 | 16 | — | — | — | 15 | 14 |
| $Al_2O_3$ | — | — | — | — | — | — | — | — | — | — | 2 | 2 | — | — | — | — | — | 0.5 | 1 | 1.4 | — | — |
| CaO | — | — | — | 10 | — | — | — | 15 | 7 | — | — | — | — | — | — | — | — | — | — | — | — | — |
| MgO | — | — | — | 10 | — | — | — | 15 | — | 7 | — | — | — | 16 | 8 | — | — | 16.5 | 16.2 | 16.2 | — | — |
| $B_2O_3$ | — | — | — | — | — | — | 24 | — | 20 | — | 20 | 20 | 24 | 24 | 24 | — | — | 23 | 23.2 | 23.2 | — | — |
| Release Rate | 10 | 201 | 138 | 45 | 2.5 | 1.5 | 1104 | 6.6 | 443 | 745 | 58 | 85 | 94 | 23 | 72 | 0.3 | 0.7 | 1.5 | 12 | 24 | 6.8 | 7.8 |

What is claimed is:

1. A process for treating trees and bushes having a xylem structure through which sap passes to provide trace elements or micro-nutrients thereto, which process comprises inserting into the xylem structure a solid glass article comprising a phosphate base glass contain- $R_2O$ (wherein R is one or more of Na, K, and Li), the maximum content of $P_2O_5$ being 55 mol %, and the minimum content of $R_2O$ being 17 mol %, the phosphate glass optionally comprising one or more glass-modifying or glass-forming materials (other than the trace elements present) in non phytotoxic amounts, the formulation of the phosphate base glass being selected so that the solubility of the phosphate glass in the sap of the tree or shrub being treated is sufficient to provide a transfer of the said trace elements or micro-nutrients from the glass into the sap by dissolution of the glass.

2. A process according to claim 1, wherein the total amount of $P_2O_5$ and $R_2O$ in the phosphate base glass is at least 60 mol %.

3. A process according to claim 1, wherein the amount of $R_2O$ is from 25 to 55 mol %.

4. A process according to claim 1, wherein the micro-nutrients are iron and zinc.

5. A process according to claim 1, wherein the solid glass article is in the form of a rod.

6. A process according to claim 5, wherein the rate of dissolution of the glass is from 0.1 to 20 mg/cm$^2$/day.

7. A process according to claim 1, wherein the solid glass article is in the form of beads or ballotini.

8. A process according to claim 7, wherein the rate of dissolution of the glass is from 1 to 10 mg/g/day.

9. A process according to claim 1, wherein the solid glass article has a formulation as specified in Table III for any one of Glasses Nos. 1 to 73.

10. A process according to claim 1, wherein the solid glass article has a formulation as specified in Table IV for any one of Glasses Nos. 74 to 95.

* * * * *